United States Patent [19]

Motoyama et al.

[11] Patent Number: 4,623,098

[45] Date of Patent: * Nov. 18, 1986

[54] GRANULATING AND COATING MACHINE

[75] Inventors: Shimesu Motoyama, Asaka; Kaoru Kurita, Ranzan; Shizuka Sakashita, Chiba; Narimichi Takei, Sugito; Shigeru Ohno, Kamakura, all of Japan

[73] Assignee: Freund Industrial Co., Ltd., Tokyo, Japan

[*] Notice: The portion of the term of this patent subsequent to Dec. 3, 2002 has been disclaimed.

[21] Appl. No.: 542,471

[22] Filed: Oct. 17, 1983

[30] Foreign Application Priority Data

Oct. 18, 1982 [JP] Japan .................................. 57-182496
Dec. 31, 1982 [JP] Japan .................................. 57-234392

[51] Int. Cl.$^4$ ............................................. B02C 23/26
[52] U.S. Cl. ........................... 241/46.04; 241/46.17; 241/57; 366/102
[58] Field of Search ............... 241/46 B, 46.04, 46.08, 241/46.11, 46.17, 49, 57, 101 B; 366/101, 102

[56] References Cited

U.S. PATENT DOCUMENTS 3,913,847 10/1975 Glatt et al. ...................... 241/57 X
4,135,671 1/1979 Kohrs ............................ 241/46.04
4,556,175 12/1985 Motoyama et al. .................. 241/57

Primary Examiner—Howard N. Goldberg
Assistant Examiner—Timothy V. Eley
Attorney, Agent, or Firm—Kane, Dalsimer, Kane, Sullivan and Kurucz

[57] ABSTRACT

A machine for use in granulation, coating, mixing, drying etc. of powdery or granular raw materials such as medicine or foods etc. The machine is comprised of a casing for containing raw materials, a rotator for tumbling and giving centrifugal force to the material in the casing rotatable horizontally in the casing and at least one disintegrator provided above the rotator for subdividing undesirously large particles. At least one agitator is provided above the rotator for agitating and kneading materials to be granulated or coated. The rotator is movable or fixed in vertical position, and an annular slit is formed between an annular slit forming ring or inner wall of the casing and outer periphery of the rotator. The slit forming ring is movable or fixed in vertical position. At least one ventilating portion is formed on at least one portion of the rotator, and a gas flow rate adjusting mechanism is provided for controlling flow rate of gas passed through the ventilating portion.

14 Claims, 31 Drawing Figures

GRANULATING AND COATING MACHINE

BACKGROUND OF THE INVENTION

1. Field of the Invention

This invention relates to a granulating and coating machine and more particularly to a granulating and coating machine which is capable of granulating, coating, mixing, and drying granular and powdery raw materials with high productivity to obtain granulated or coated products having narrowly dispersed particle size and good sphericity.

2. Prior Art

Granulation is one of the most useful ways of processing in many industries. But it has long been one of the most difficult processes. In the traditional methods, which comprises many steps, each unit step requires different unit equipment and skilled workers. For this reason, traditional granulation is very low in productivity, very difficult in technology and does not conform to GMP (Good Manufacturing Practice).

Fluidized bed granulation was developed as a quite new process to overcome the drawbacks of traditional granulation. Specifically, it requires only one piece of equipment, a fluidized bed granulator. It easily conforms to GMP.

Fluidized bed granulation, however, has big disadvantages both in technique and in quality of the product. Fluidization is performed only on the hard balance of lifting force of air and gravity on the particles. The balance easily tends to be upset since the particles' size, shape and weight are changed during fluidization. This is the basic difficulty of fluidized bed granulation. Furthermore, the concentration of particles should be lowered to avoid any interaction between them and keep a good fluidizing state. This makes the space yield of fluidization granulation very low. Qualitywise, enlarged particles obtained by this method are generally very bulky, coarse and brittle, due to the lack of kneading and tumbling and also are distributed widely in their particle size.

In order to overcome these disadvantages, there were provided many developments in fluidized bed granulators not only for granulating but also for coating, mixing, and drying granular and powdery materials for use in the fields of medicine, foods, powdered metals, catalysts, ferrite, ceramics, detergents, cosmetics, dyestuffs, pigments, toner, etc.

Examples of such prior development are German Pat. Nos. 2738485 and 2805397 which disclose machines having a rotary plate or disk over a mesh provided at the bottom of a granulating casing. This prior art can be used for granulation and coating, but it has a drawback in that the granulated materials are caught between the rotary disk and the mesh so as to be disintegrated by being rubbed against the mesh when the rotary disk is rotated. In this prior art, another drawback which should be mentioned is that the powdery materials tend to leak through the mesh. In addition to these drawbacks, this prior art can not control the bulk density of the granulated materials, as the result of this, it is able to granulate only heavy products with widely distributed particle size.

As another prior art, there is provided a machine including an agitator in a casing and a disintegrator arranged along side of and over the agitator. This prior machine can provide relatively high productivity, but ha drawbacks in that the shapes of the granulated or coated products are not uniform, it is difficult to obtain products with good sphericity, and the particle size of the products distributes to the wide range. Mcreover, in this prior machine, as the drying of the products is impossible, other drying equipment is required separately.

Further, Japanese Patent Publication No. 56-35891 discloses a granulator wherein a side slit for feeding gas into the casing from the side thereof is provided in the side wall of the casing in addition to the prior machine disclosed as the second prior art. This prior art, however, has the same drawbacks as the second prior art has, except for the improvement in the drying effect achieved by the gas fed through the side slit.

SUMMARY OF THE INVENTION

It is an object of the present invention to provide a granulating and coating machine which can obtain granulated or coated products having a narrow range of particle size distribution and good sphericity with high productivity.

It is another object of the present invention to provide a granulating and coating machine with simple structure and low production cost.

In order to perform the above objects, the granulating and coating machine according to the present invention includes a casing for loading the powdery or granular raw materials to be granulated or coated, a rotator rotatable substantially horizontally in the bottom of the casing, an annular slit for feeding slit gas into said casing formed between said casing and the outer periphery of said rotator and, a disintegrator mounted above the rotator.

An agitator may be provided above the rotator to rotate substantially horizontally independent from the rotator.

The rotator may be formed with a ventilating portion or portions in at least one portion thereof, and means for controlling the rate of the gas flow may be provided for adjusting directly the rate of the gas flow passing through the ventilating portion.

A slit forming means may be provided on the inner wall of the casing. At least one of the rotator or the slit forming means may be moved vertically to control the gap of the slit.

BRIEF DESCRIPTION OF THE DRAWINGS

Other objects and advantages of the present invention will become apparent from the following detailed description taken in conjunction with preferred embodiments shown in the accompanying drawings, in which.

DETAILED DESCRIPTION OF THE PREFERRED EMBODIMENTS

Figure 1:
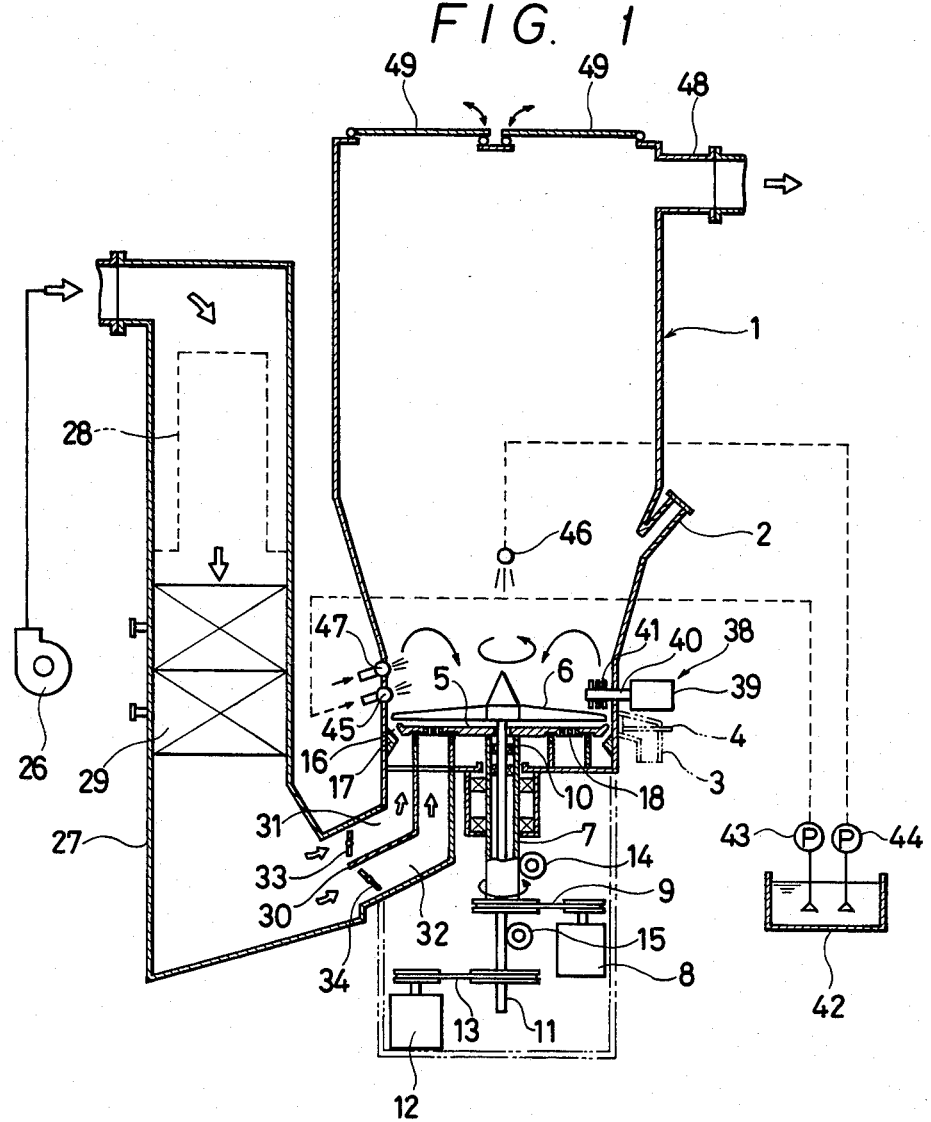
FIG. 1 is a general sectional view of the granulating and coating machine according to one embodiment of the present invention.

Referring now to the drawings, FIG. 1 shows a general partial sectional view of one embodiment of the granulating and coating machine in accordance with the present invention.

The granulating and coating machine of this embodiment has a granulating chamber or casing 1 for granulating or coating the powdery or granular raw materials charged into the casing 1. Casing 1 is arranged in the upright direction and has a substantially cylindrical shape. At the intermediate height of the side wall of the casing 1 there is provided a chute 2 slanted upwardly and outwardly for feeding the materials to be granulated or coated. The side wall of the bottom portion of the casing 1 has a discharge chute 3 for discharging the granulated or coated products and a discharge valve 4 for opening and closing the discharge opening.

At the inside of the bottom portion of the casing 1 at substantially the same level as the discharge chute 3, there is provided a rotator or rotary disk 5 for tumbling and outward movement of the powdery or granular raw materials by rotating substantially horizontally in the casing 1. An agitator 6 for mixing and accelerating outward movement of the powdery or granular raw materials being granulated or coated is provided above the rotator 5 to be rotated in the substantially horizontal plane.

The rotator 5 is rotated by driving a hollow rotary shaft 7 provided vertically at the center of the granulating chamber of the casing 1 in the desired direction via a belt 9 from a driving motor 8 of the variable speed type.

The agitator 6 is rotated in a direction and at a speed independent from those of the rotator 5 by rotating a rotary shaft 11 inserted coaxially into the hollow rotary shaft 7 and supported by bearings 10 via a belt 13 from another driving motor 12 of the variable speed type.

The rotator 5 and agitator 6 are moved in the vertical direction respectively and independently by each of the different lift mechanisms 14 or 15. These lift mechanisms 14, 15 may, for example, comprise the worm and rack type.

The lift mechanism 14 ca adjust the clearance or width of an annular gap or slit 16 between the outer periphery of the rotator 5 and the inner wall of the casing 1, for example, in the range from 0 to ten-odd millimeters by moving the rotator 5 upwardly or downwardly so as to make it possible to control the flow rate of the slit gas, for example, heated or cooled air blown into the inside of the casing 1 through the slit 16 from the lower side of the rotator 5, to keep the condition in the casing 1 in the optimum state according to any steps of the granulating or coating operations etc.

Figure 2:
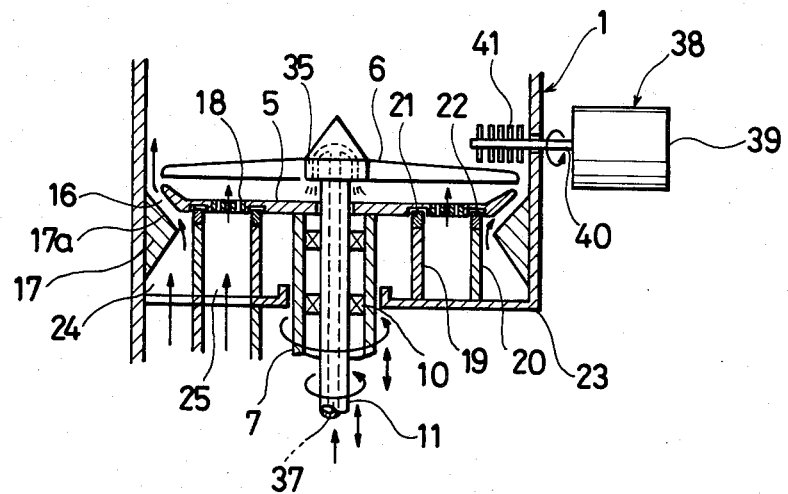
FIG. 2 is a enlarged partial sectional view of the major part thereof.

In order to adjust the flow rate of the slit gas, as shown most clearly in FIG. 2, an annular ring 17 of triangular sectional shape is provided on the inner wall of the casing 1 at a position adjacent to the outer periphery of the rotator 5. The width of the slit 16 formed between the upwardly expanded slit forming surface 17a of the annular slit forming ring 17 and the outer periphery of the rotator 5 is adjusted by moving the rotator 5 upwardly or downwardly by means of the lift mechanism 14. The width or gap of the slit 16 may also be adjusted by changing the vertical position of the annular ring 17 itself.

Figure 3:
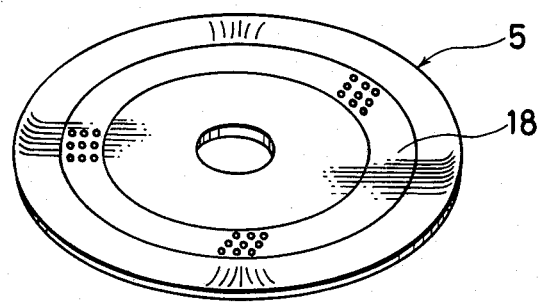
FIG. 3 is a perspective view showing one embodiment of the rotator or disk in accordance with the present invention.

As shown in FIG. 3, the rotator 5 of this embodiment has a ventilating portion 18 made of a ring of perforated plate in the circumferehtial position slightly outside of the intermediate portion of the radial dimension thereof. This ventilating portion 18 may be made of a sintered plate having such small holes which can prevent powdery or granular material from dropping off therethrough, or a mesh etc. The position of the ventilating portion 18 is preferably outside of the intermediate portion of the radial dimension of the rotator 5. In case that the diameter of the rotator is large, in order to promote sufficiently the centrifugal tumbling action of the powdery or granular materials on the rotator 5, perforation inside of the intermediate portion thereof may be available. The ventilating portion 18 may be provided other than circumferential direction, for example, it is possible to provide the ventilating portion 18 as radial notches at any positions of the rotator 5.

The purpose for which the ventilating portion 18 is provided is to produce a different flow pattern of the powdery or granular materials in the casing 1 from the flow pattern produced by the slit gas fed through the slit 16, in order to manufacture efficiently the granulated or coated products of superior quality including, for example, low segregation and widely controllable bulk density by blowing gas such as heated or cooled air, into the casing 1 through the ventilating portion 18 from the lower side of the rotator 5. This gas flow through the ventilating portion 18 is fed independently from the slit gas flow through the slit 16.

To obtain these two different gas flows, there are provided annular partition walls 19, 20 on a bottom wall 23. Each of these partition walls 19, 20 has a seal ring 21, 22 of labyrinth type at the uper end respectively. These seal rings 21, 22 are inserted into grooves formed on the lower surface of the rotator 5. By means of these annular partition walls 19 and 20, two gas passages 24 and 25 are formed separately, one for the slit gas blown into the casing 1 through the slit 16 and the other one for the gas blown into the casing 1 through the ventilating portion 18 respectively. These gas passages 24, 25 are separated from each other to form different gas feeder lines.

The slit gas through the slit 16 and the gas through the ventilating portion 18 are at first fed in common from a feeder fan 26 shown in FIG. 1, then cleaned by filtration passing through a filter 28 in a feeder duct 27, and after heating or cooling to the desired temperature by heat exchanging at a heat exchanger 29, fed to the bottom portion of the feeder duct 27. The gas feeder line from the bottom portion of the feeder duct 27 to the bottom portion of the casing 1 is separated to form a slit gas passage 31 and a gas passage 32 led to the ventilating portion 18 by means of a partition wall 30 connected to the annular partition wall 20 of the gas passages 24 or 25. Each of the slit gas passage 31 and the gas passage 32 is communicated with each of the slit gas passage 24 and the gas passage 25 to form two independent gas feeder lines, one leads to the slit 16 and the other leads to the ventilating portion 18.

In the vicinity of the entrance of each gas passage 31, 33, a control valve or damper 33 for regulating the flow rate of the slit gas fed to the slit 16, and a control valve 34 for regulating or adjusting the flow rate of the gas fed to the ventilating portion 18 are provided. By adjusting these flow rate control valves 33 and 34 independently, it becomes possible to obtain various flow patterns formed by these two gas flows blown into the casing 1 through the slit 16 or the ventilating portion 18.

Figure 4:
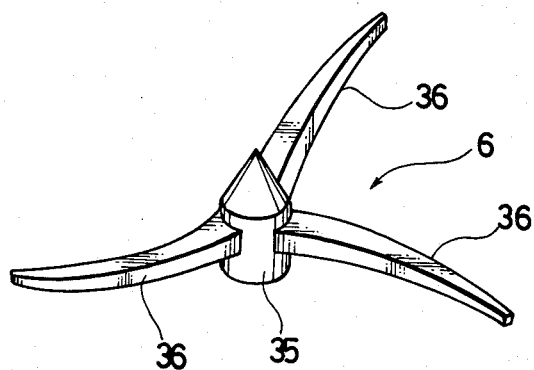
FIG. 4 is a perspective view showing one embodiment of the agitator in accordance with the present invention.

The agitator 6 of this embodiment, as shown in FIG. 4, has three agitating blades 36 at the side of a boss 35. Each of the blades 36 is like a curved nail in shape and arranged to extend at an angle of 120 degrees with each other so as to increase mixing, kneading and accelerating centrifuged force. As shown in broken line in FIG. 2, the agitator 6 is designed to blow out the purge gas fed through the gas passage 37 from the lower side of the boss 35, formed in the rotary shaft 11, in order to prevent the powdery or granular raw materials from entering into the gap formed between the rotary shaft 11 and the rotator 5.

Further, in this embodiment, at a position above the outside area of the agitator 6, there is provided a breaking means or disintegrator 38 arranged horizontally into the casing 1 from the outside thereof.

Figure 5:
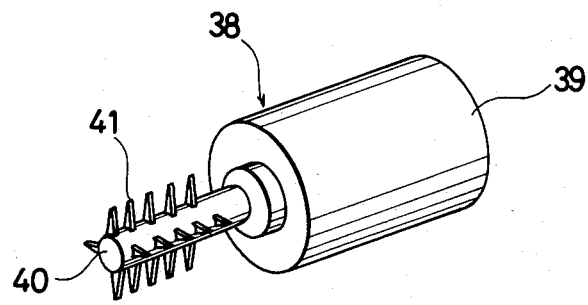
FIG. 5 is a perspective view showing one embodiment of the disintegrator in accordance with the present invention.

As shown in FIG. 5, the disintegrator 38 is comprised of a disintegrating shaft 40 rotatable by an electric or an air motor 39, and a plurality of disintegrating blades 41 projected radially outwardly from the outer surface of the shaft 40. These disintegrating blades 41 are rotated in the bed of materials being granulated or coated which are tumbled along the inner wall of the casing 1 by means of the rotations of the rotator 5 and the agitator 6. The rotational speed of the blades 41 or shaft 40 is high, for example, faster than that of the rotator 5 and the agitator 6. Thereby, the bed of powdery or granular materials being granulated or coated is given particle size regulation by disintegrating large particles, mixing and dispersion, and crushing granulation actions, in addition to tumbling granulation and coating actions by the rotator 5 and agitating, mixing and kneading actions by the agitator 6. As a result of these multiple actions, it becomes possible to obtain granulated or coated products having smooth surfaces with very high productivity. In other words, by providing the granulating and coating machine with disintegrating blades 41, it becomes capable of performing granulation or coating while subdividing undesired large particles formed in the bed into the desired particle size by the shearing force of the disintegrating blades 41.

At the side wall of the casing 1 near the bottom portion thereof just upper level of the agitator 6, and above the agitator about center of the casing 1, there are provided two two-fluid type spray nozzles 45 and 46 respectively for spraying a coating or binder solution fed from a liquid tank 42 by each of pumps 43 and 44.

At the side wall of the casing 1 just above the spray nozzle 45, a nozzle 47 is provided for feeding the powdery or granular materials into the fluidized or granulating bed in the casing 1.

In the side wall of the top portion of the casing 1, an exhaust duct 48 is connected for discharging the exhaust gas from the fluidized or granulated bed out of the system. Covers 49 for explosion venting are hinged to the top wall of the casing 1.

A dust collector such as a bag filter or a cyclone etc. may be provided at the upper area in the casing 1 or outside thereof. However, in this embodiment, by providing the disintegrator 38, the granulation or coating can be performed after the powdery or granular materials to be granulated or coated in the casing 1 are wetted by spraying enough binder or coating solution thereon so as to prevent escaping of fine powders. Therefore, this embodiment has the additional advantage that such a dust collector may not necessarily be provided.

The operation of this embodiment is described in the following.

At first, a predetermined volume of the powdery or granular raw materials to be granulated or coated is fed into the granulating casing 1 through the chute 2.

The gas flow control valves 33, 34 are opened to adjust the gas flow rate through ducts 31, 32 independently to allow the gas from the feeder fan 26 blown into the casing 1 through the slit 16 and ventilating portion 18 of the rotator 5.

The vertical position of the rotator 5 is set at a predetermined level by adjusting or controlling the lift mechanism 14 in order to adjust the width of the slit 16 formed between the outer periphery of the rotator 5 arranged in the bottom portion of the chamber or casing 1 and the inclined surface 17a of the annular ring 17 mounted on the inner wall of the casing 1. Secondly, the vertical position of the agitator 6 is adjusted at a predetermined level by controlling the lift mechanism 15.

Under such a condition, the rotator 5 is rotated by driving the motor 8 via the belt 9 and the hollow rotary shaft 7, and the agitator 6 is rotated by driving the motor 12 via the belt 13 and the rotary shaft 11 in the same or reverse direction with that of the rotator 5 in order to agitate the materials being granulated or coated. At that time, the disintegrating blades 41 of the disintegrator 38 are rotated by driving motor 39 to subdivide the undesired large particles formed in the bed of powdery or granular materials being granulated or coated into desired particle size by the shearing force of the disintegrating blades 41.

After that, a binder or coating solution fed from the liquid tank 42 by the pumps 43 or 44 is sprayed onto the materials to be granulated or coated through the spray nozzles 45 and/or 46. If desired, a solid or powdery granulating or coating materials may be fed onto the materials to be granulated or coated from the nozzles 47. The exhaust gas from the casing 1 is discharged out of the system through the exhaust duct 48. To help exhausting gas, another fan may be provided downstream.

Figure 6:
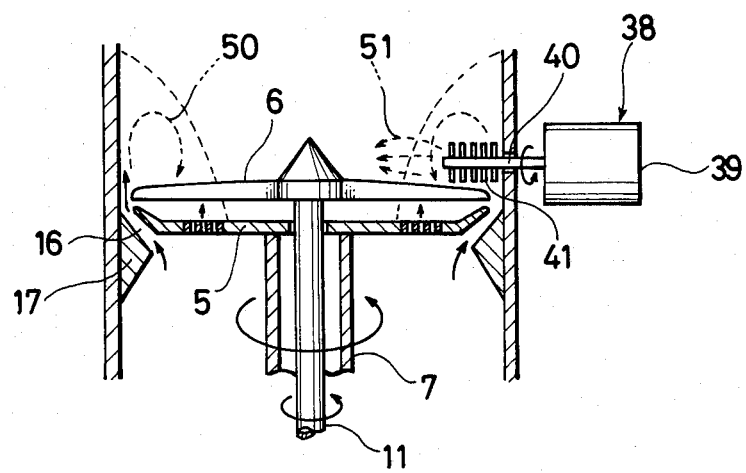
FIGS. 6 and 7 are partial vertical sectional view and partial horizontal sectional view respectively, showing granulating and coating action in accordance with the embodiment shown in FIG. 1.
Figure 7:
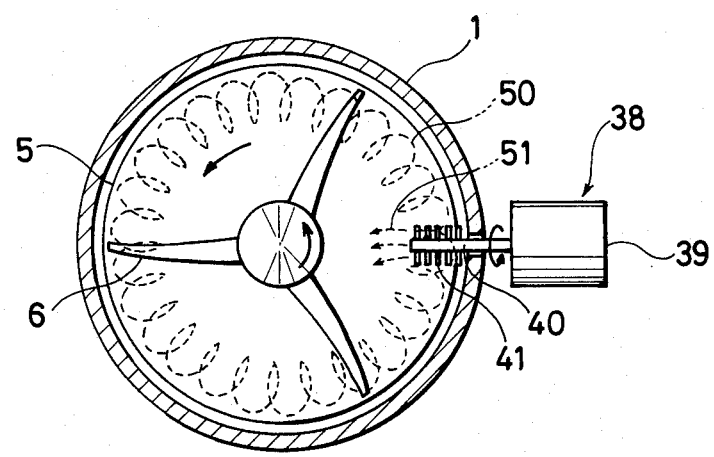

In the above operation, according to the granulating and coating machine in this embodiment, by means of the combined rotational motion of the rotator 5 and the agitator 6, and combination of two gas flows consisted of the slit gas flow through the slit 16 and the gas flow through the ventilating portion 18 of the rotator 5, the powdery or granular raw materials are fluidized agitated, mixed, tumbled and given centrifugal force. Thereby, as shown in FIGS. 6 and 7, the powdery or granular materials form a tumbling bed or bed 50 of the materials which create a tumbling motion near the inner wall of the casing 1. By rotating the disintegrating blades 41 of the disintegrator 38 in the bed 50 large particles of materials in the bed 50 are subdivided by the shearing force of the disintegrating blades 41 to achieve desired particle sizes distributed in a narrow range, and as shown by a broken line arrow 51 in FIGS. 6 and 7, the materials are moved toward the center of the casing 1 in order to obtain better subdivision and mixing actions.

Therefore, according to this embodiment, by subdivision, which leads to particle size regulation, mixing, dispersion actions etc. obtained by means of the disintegrating blades 41 of the disintegrator 38, in addition to the combined rotational motions of the rotator 5 and the agitator 6, and combination of the two gas flows consisted of the slit gas fed through the slit 16 and the gas fed through the ventilating portion 18, it is possible to obtain spherically granulated or coated particles having narrowly dispersed particle size with very high productivity.

Moreover, according to this embodiment, by providing the disintegrator 38, it is possible to perform granulation or coating by means of mixing and kneading obtained by the rotation of the rotator 5, agigator 6 and disintegrating blades 41 after the feeding of the binder or coating solution is completed in one time not by spraying into or onto the powdery or granular materials loaded in the casing 1. As a result, the granulation or coating can be completed in a very short time. Further, scattering of fine powder in the casing 1 is prevented to obtain the products being homogeneous in ingredient contents without segregation of ingredients of the raw materials.

Therefore, because of the prevention of scattering of fine powder, it may be unnecessary to provide a bag filter in the casing 1. In that case, of course, a simple cyclone (not shown) may be provided outside of the casing 1. Thereby, a granulating or coating machine of low cost and high efficiency can be obtained, due to the absence of the bag filter.

Further, in case of the powdery or granular materials which have high specific gravities, for example, ceramics, powdered metals, or ferrite etc., according to prior art, once the fluidized state is broken for some reason or other, it is almost impossible to restart the fluidization. On the contrary, it is possible to restart the fluidization very easily, in this embodiment, by mechanical actions such as rotations of the agitator 6 the rotator 5 and the disintegrating blades 41, help restarting of fluidization by the air flow through the slit 16 and the ventilating portion 18 of the rotator 5.

Moreover, according to this embodiment, by providing the disintegrator 38, smaller particles than without it can be obtained, and by changing the rotational speed of the disintegrating blades 41, the particle size of the products can be changed easily. Namely, when the rotational speed of the disintegrating blades 41 is low, relatively large particles are obtained and when the rotational speed is high, relatively small particles are obtained.

The products granulated or coated are discharged smoothly from the chute 3 by the combined effect of the rotations of the rotator 5 and the agitator 6.

Figure 8:
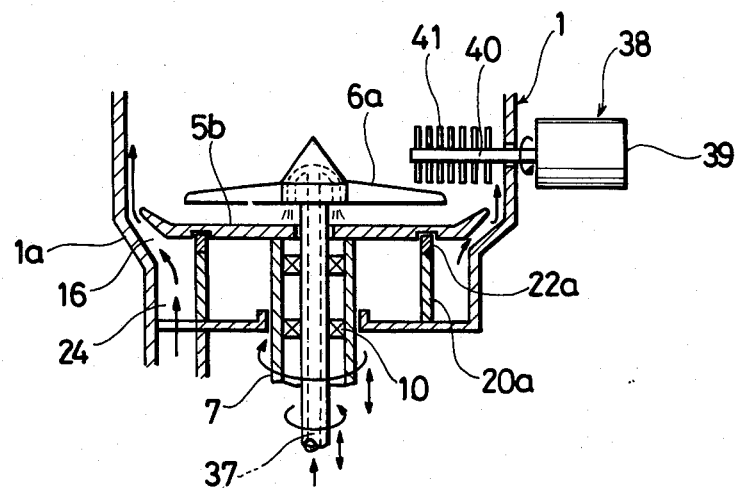
FIG. 8 is a partial sectional view showing another embodiment of the granulating and coating machine in accordance with the present invention.

FIG. 8 is a partial sectional view showing another embodiment of the granulating and coating machine in accordance with the present invention.

In this embodiment, the rotary disk 5b is comprised of a planar disk, and this disk 5b has no ventilating portion such as the ventilating portion 18 in the above embodiment. The side wall of the casing 1 in the vicinity of the periphery of the rotary disk 5b is formed as an inclined surface 1a which is expanded upwardly. Therefore, the width of the slit 16 can also be adjusted as desired as in the former embodiment, by moving the rotary disk 5b vertically by means of the lift mechanism 14. The agitator 6a of this embodiment has a smaller diameter than the rotary disk 5b.

In the embodiment shown in FIG. 8, it is possible to granulate or coat the products with high bulk density, sharply dispersed particle size and with high productivity by means of the combined rotational motion of the rotary disk 5b and agitator 6a and the slit gas fed through the slit 16.

The side wall of the casing 1 which forms the slit 16 between the outer periphery of the rotary disk 5b and the side wall itself may be inclined downwardly in a reverse direction to the inclined surface 1a. This is the same as in the case of the annular ring 17 in the above described embodiment. It may be possible to arrange the annular ring 17 above the rotary disk 5 or 5b to use the surface expanded downwardly of the casing 1, as a slit forming surface.

Figure 9:
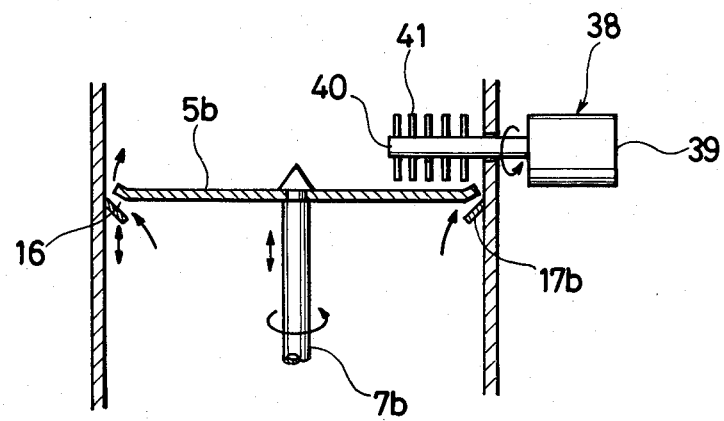
FIG. 9 is a partial sectional view showing other embodiment of the present invention.

FIG. 9 is a partial sectional view of the granulating and coating machine according to another embodiment of the present invention.

In this embodiment, the rotary disk 5b is comprised of a disk without the ventilating portion, and there is provided no agitator over the disk 5b. Further, annular ring for slit forming means is consisted of an annular ring 17b having a plate-like sectional shape and movable upwardly and downwardly.

According to this embodiment, it is possible to obtain spherical particles with particle size distributed in narrow range by means of centrifugal tumbling movement of the raw materials on the surface of the rotary disk 5b and the surface of inner wall of casing 1, and to prevent sticking of the raw materials on the inner wall surface of the casing and dry granulated or coated particles by the slit gas fed through the slit 16. Moreover, by the combined effects of disintegration, mixing, dispersion etc. by means of the disintegrator 38, it is possible to obtain granulated or coated particles having high sphericity and sharply distributed particle size with fairly high productivity, and dry granulated or coated particles without separate drying equipment. Also, in this embodiment, segregation of ingredients in granulated or coated particles can be reduced. These effects are realized by the combined actions by means of the rotation of the rotary disk 5b, the slit gas through the slit 16 and the disintegrating effect by the disintegrator 38.

Figure 10:
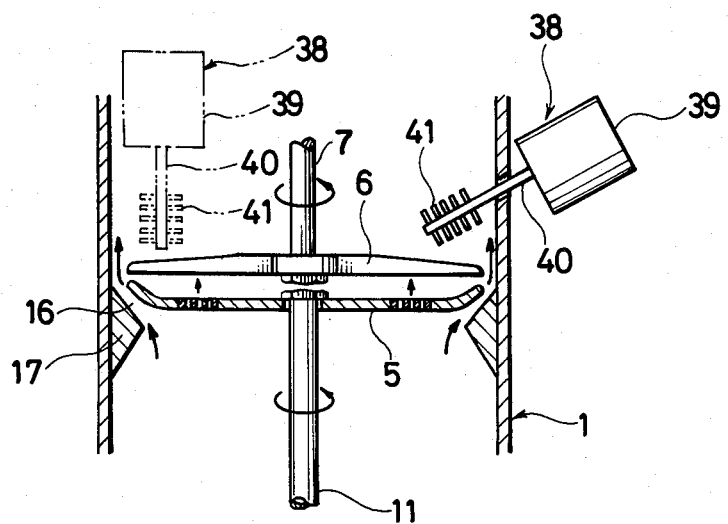
FIG. 10 is a partial sectional view showing further embodiment of the present invention.

FIG. 10 is a partial sectional view of another embodiment of the granulating and coating machine in accordance with the present invention.

In this embodiment, the disintegrator 38 is provided through the side wall of the casing 1 in downwardly slanted condition toward the center of the casing 1. It is possible to disintegrate, mix, and disperse raw materials by the disintegrating blades 41 of the disintegrator 38. The agitator 6 is attached to the lower end of shaft 7 extending downwardly from shaft 7 which is coaxial with the shaft 11 of rotator 5.

In another way, the disintegrator 38 may be arranged vertically to position the disintegrating blades 41 at the lower portion of the disintegrating shaft 40 as shown in phantom line in FIG. 10.

FIGS. 11-16 show other several embodiments of the disintegrator according to the present invention.

Figure 11:
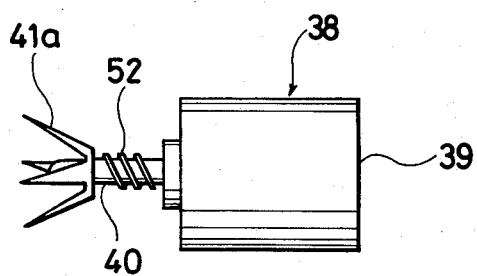
FIGS. 11–16 show several embodiments of the disintegrator in accordance with the present invention.

In the embodiment shown in FIG. 11, there is provided a screw 52 on the surface of the disintegrating shaft 40 for feeding the raw materials being granulated or coated toward center of the casing 1, and disintegrating blades 41a expanded gradually beyond free end of the disintegrating shaft 40 are provided at the free end of the shaft 40 as the disintegrating blade.

Figure 12:
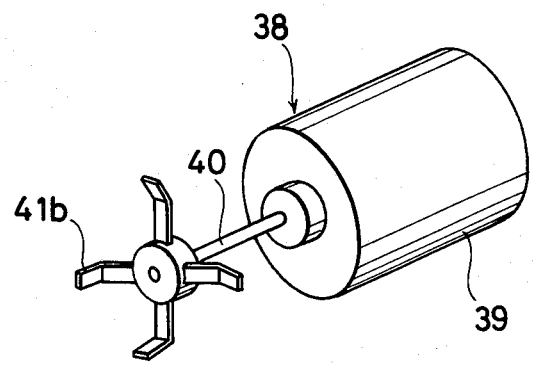

In the embodiment shown in FIG. 12, the disintegrating blades are comprised of four plate-like blades 41b arranged radially at the angle of 90 degrees with each other at the free end of the disintegrating shaft 40, the free end of each blade 41b is bent endwise of the disintegrating shaft 40.

Figure 13:
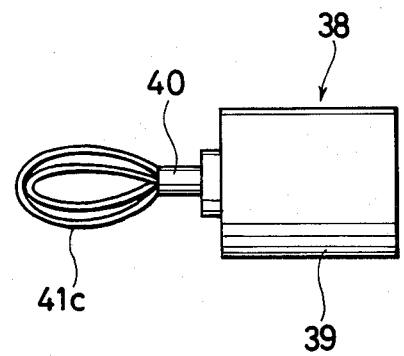

The embodiment shown in FIG. 13 has disintegrating blades 41c consisted of two loops arranged in two planes normally rectangularly crossed with each other.

Figure 14:
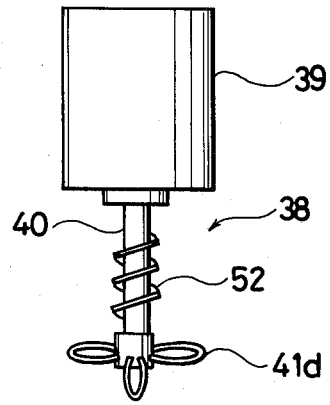

According to the embodiment in FIG. 14, the screw 52 is provided on the disintegrating shaft 40, and four loop-like disintegrating blades 41d are arranged radially at the angle of 90 degrees with each other at the free or lower end of the shaft 40. This disintegrator 38 is adequate to use in the vertical arrangement as shown in FIG. 14.

Figure 15:
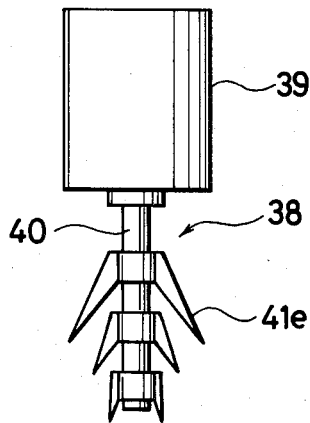

In the embodiment shown in FIG. 15, three pairs of disintegrating blades 41e expanded gradually in the endwise direction are provided on the disintegrating shaft 40.

Figure 16:
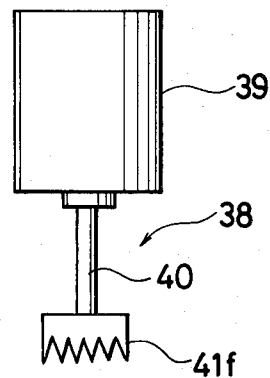

Further, in the embodiment shown in FIG. 16, downwardly projected saw tooth-like disintegrating blades 41f are provided at the free or lower end of the disintegrating shaft 40. This disintegrator 38 is also suitable for use in the vertical arrangement as shown in FIG. 16.

Examples made by using the granulating and coating machine of the present invention is shown in the following in comparison with conventional examples.

EXAMPLE 1

A machine according to the present invention 1 shown in FIG. 9, which has a disintegrator is provided. Its casing has a diameter of 400 millimeters and height of 2,000 millimeters.

Total 12.0 kgs of powdery raw materials comprised of 11.4 kgs of lactose, 0.6 kg of maleic acid chlorophenylamine were supplied into the machine. Slit gas heated to 80° C. was fed into the casing of the machine through an annular slit between a rotary disk and the inner surface of the casing at a flow rate of 4 $Nm^3/min$.

The rotary disk was rotated at a rate of 200 r.p.m. The disintegrator was rotated at a rate of 3,000 r.p.m. 1.2 lit. of 8% aqueous solution of hydroxypropyl cellulose ("HPC-L" manufactured by Nippon Soda Co., Ltd.), which comforms to Japanese Pharmacopeia(X) (hereinafter refer to as J.P.(X)) was fed in a very short time without using spraying. After as short as 16 minutes dried granules with sharply dispersed particle size and no segregation were obtained.

COMPARATIVE EXAMPLE 1

For comparison, a known machine, wherein the bottom was comprised of a rotary disk and slit air was fed through an annular slit between the rotary disk and the inner wall of a casing, was used for granulation. The casing had a diameter of 400 millimeters and a height of 2,000 millimeters. In this known machine, rotational speed of the rotary disk, flow rate of the slit air, volume of the same raw materials as used in Example 1, volume of 8% aqueous solution of hydroxypropyl cellulose conforms to J.P.(X) as a binder solution were changed respectively in the range from 100 to 300 r.p.m., from 3 to 10 $Nm^3/min$., from 5 to 12 kgs, and from 0.5 to 3.0 lit. However, when a spray system was not used for feeding the binder solution in a short time, it was impossible to obtain granulated products because undesirously large mass was generated. So, in another method, wherein 8% aqueous solution of hydroxypropyl cellulose conforms to J.P.(X) was supplied from a spray system in the form of fine mist, 12 kgs of the same raw materials were charged, the rotational speed of the rotary disk was 200 r.p.m., and the air heated to 80° C. was introduced through the slit at a flow rate of 4 $Nm^3/min$. In this case, when 2.2 lit. of 8% aqueous solution of hydroxypropyl cellulose conforms to J.P.(X) was sprayed from the spray system, granulated and dried products were obtained, but composition was not homogeneous and particle size was distributed in wide range. The time required was as long as 32 minutes, just twice longer than Example 1.

COMPARATIVE EXAMPLE 2

Further, for comparison, other known mixing granulating machine comprised of an agitator and disintegrator was used for granulation. In this example, rotational speed of the agitator was changed in the range from 100 to 500 r.p.m., and 8% aqueous solution of hydroxypropyl cellulose conforms to J.P.(X) was supplied in a short time without using spray system and the volume of the solution was changed in the range from 0.5 to 2.0 lit. But, in this experiment, granulated products could not be obtained when the volume of raw materials was 12 kgs. So, in another method, the volume of raw materials was reduced to total 6 kgs and ratio of ingredients was the same as that of the above method, the agitator was rotated at a speed of 300 r.p.m. and the disintegrator was rotated at a speed of 3,000 r.p.m., and 0.5 lit. of 8% aqueous solution of hydroxypropyl cellulose conforms to J.P.(X) was supplied in the same way as that of the above method. Then, wet granulated products were obtained in 3 minutes, but shape was irregular, composition was not homogeneous and particle size was distributed to wide range.

The results of these experiments are comparatively shown in Tables 1, 2, and 3.

TABLE 1

|  | Charge (Kg/B) | Time (min) | Production per unit time (Kg/min) | Shape of granulated particle | Bulk density of granulated particle (g/cc) |
| --- | --- | --- | --- | --- | --- |
| The present invention 1 | 12 | 16 | 0.75 | fairly round | 0.70 |
| Comparative example 1 | 12 | 32 | 0.38 | round | 0.65 |
| Comparative example 2 | 6 | 3*1 |  | irregular | 0.72 |

*1 In comparative example 2, time for obtaining wet granulated particles is shown because drying mechanism is not provided.

TABLE 2

|  | Necessity of spray system | Presence of sticking on wall surface | Particle size distribution of granulated products [%] | | | | |
| --- | --- | --- | --- | --- | --- | --- | --- |
|  |  |  | ~60 mesh | 60~100 mesh | 100~150 mesh | 150~200 mesh | 200~ mesh |
| The present invention 1 | No | No | 2.3 | 11.2 | 54.5 | 29.4 | 2.6 |
| Comparative example 1 | Yes | No | 9.4 | 29.9 | 36.3 | 19.6 | 4.8 |
| Comparative example 2 | No | Yes | 3.5 | 11.1 | 38.4 | 23.7 | 23.3 |

TABLE 3

| | *2 Content of maleic acid chlorophenylamine in classified particle size [%] | | | | |
| --- | --- | --- | --- | --- | --- |
|  | ~60 mesh | 60~100 mesh | 100~150 mesh | 150~200 mesh | 200~ mesh |
| The present invention 1 | 102 | 100 | 100 | 100 | 98 |
| Comparative example 1 | 129 | 105 | 99 | 87 | 72 |
| Comparative example 2 | 135 | 123 | 115 | 97 | 68 |

*2 Content of maleic acid chlorophenylamine [%] = $\frac{\text{analytical value}}{\text{theoretical value}} \times 100$

EXAMPLE 2

A machine according to the present invention, similar to that shown in FIG. 1, which was consisted of a casing having a diameter of 400 millimeters and a height of 2,000 millimeters, a rotator having a ventilating portion, an agitator and a disintegrator, was provided.

A total of 20 kgs of the raw materials comprised of 13.5 kgs of lactose, 6 kgs of corn starch and 0.5 kg of maleic acid chlorophenylamine were charged into the casing. The agitator and disintegrator were rotated at a rate of 300 r.p.m. and 3,000 r.p.m. respectively.

Two litters of 8% aqueous solution of hydroxypropyl cellulose ("HPC-L" manufactured by Nippon Soda Co., Ltd.), which conforms to J.P.(X), was supplied in a short time without using spray system.

Slit air heated to 80° C. was fed through an annular slit formed between the casing and the outer periphery of the rotary disk at a flow rate of 4 Nm³/min.

The rotator was rotated at a rate of 200 r.p.m. After 3 minutes of operation, while maintaining slit air as before, the air heated to 80° C. was fed through the ventilating portion formed in the rotator at a flow rate of 6 Nm³/min. After as short as 9 minutes, total 12 minutes, dried granules with homogeneous composition and sharply dispersed particle size were obtained.

COMPARATIVE EXAMPLE 3

For comparison, another machine disclosed in the Japanese Patent Application No. 57-167087 filed by the same applicant as the present applicant on Sept. 24, 1982 with the title of "A granulating and coating machine" was used for granulation. This machine was comprised of a casing having a diameter of 400 millimeters and a height of 2,000 millimeters, a rotator having a ventilating portion for feeding air, an annular slit formed between inner surface of the casing and outer periphery of the rotator for feeding air therethrough. The rotational speed of each of the rotator and the agitator was changed respectively in the range from 100 to 300 r.p.m. and from 100 to 500 r.p.m. The volume of each of the slit air fed through the slit, the same raw materials as used in the Example 2 charged into the casing, and 8% aqueous solution of hydroxypropyl cellulose conforms to J.P.(X) was changed in the range from 3 to 10 Nm³/min, from 5 to 20 kgs, and from 1 to 5 lit., respectively. However, in one method, wherein the 8% aqueous solution of hydroxypropyl cellulose conforms to J.P.(X) was fed without using a spray system, it was impossible to obtain granulated products, because undesirously large mass was generated. Then, according to another method, wherein 8% aqueous solution of hydroxypropyl cellulose conforms to J.P.(X) was supplied as fine mist by a spray system, 20 kgs of raw materials were charged into the casing, each of the rotator and the agitator was rotated respectively at the speed of 200 r.p.m. and 300 r.p.m., and while 4 lit. of 8% aqueous solution of the hydroxypropyl cellulose was sprayed, air heated to 80° C. was fed through the slit at flow rate of 4 Nm³/min in 9 minutes, thereafter air heated to 80° C. was fed through the slit at flow rate of 4 Nm³/min and through the ventilating portion of the rotator at flow rate of 6 Nm³/min. In this method, dried granules were obtained, but the composition was not homogeneous and particle size was distributed to wide range. The time required was as long as 29 minutes.

COMPARATIVE EXAMPLE 4

Further, for comparison, a known mixing granulating machine comprised of a casing having a diameter of 400 millimeters, an agitator, and a disintegrator but no path for air stream was used for granulation, using the same raw materials as used in Example 2. In one method, rotational speed of the agitator was changed in the range from 100 to 500 r.p.m., and volume of 8% aqueous solution of hydroxypropyl cellulose conforms to J.P.(X) was changed in the range from 1 to 5 lit. in a short time without using a spray system. However, when volume of raw materials was 20 kgs, granulated particles could not be obtained. Then, in another method, total volume of raw materials having the same composition as used in the above method was reduced to 6 kgs, the agitator was rotated at a speed of 300 r.p.m., the disintegrator was rotated at a speed of 3,000 r.p.m., and 0.5 lit. of 8% aqueous solution of hydroxypropyl cellulose conforms to J.P.(X) was fed without using a spray system. In this method, wet granulated products were obtained in 3 minutes, but the shape of granules was irregular, the composition was not homogeneous and particle size was distributed to wide range.

The results obtained in these examples were shown in Tables 4, 5, and 6.

TABLE 4

| | Charge (Kg/B) | Time (min) | Production per unit time (Kg/min) | Shape of granulated particle | Bulk density of granulated particle (g/cc) |
|---|---|---|---|---|---|
| The present invention 2 | 20 | 12 | 1.67 | fairly round | 0.64 |
| Comparative example 3 | 20 | 29 | 0.69 | fairly round | 0.52 |
| Comparative example 4 | 6 | 3*3 | | irregular | 0.61 |

*3 In comparative example 4, time for obtaining wet granulated particles is shown because drying mechanism is not provided.

TABLE 5

| | Necessity of spray system | Presence of sticking on wall surface | Particle size distribution of granulated products [%] | | | | |
|---|---|---|---|---|---|---|---|
| | | | ~60 mesh | 60~100 mesh | 100~150 mesh | 150~200 mesh | 200~ mesh |
| The present invention 2 | No | No | 3.1 | 8.5 | 52.2 | 32.3 | 3.9 |
| Comparative example 3 | Yes | No | 12.6 | 23.8 | 32.8 | 22.3 | 8.5 |
| Comparative example 4 | No | Yes | 5.4 | 14.3 | 35.5 | 26.2 | 18.6 |

TABLE 6

| | *4 Content of maleic acid chlorophenylamine in classified particle size [%] | | | | |
|---|---|---|---|---|---|
| | ~60 mesh | 60~100 mesh | 100~150 mesh | 150~200 mesh | 200~ mesh |
| The present invention 2 | 102 | 101 | 100 | 100 | 96 |
| Comparative example 3 | 118 | 102 | 101 | 96 | 74 |
| Comparative example 4 | 131 | 112 | 110 | 95 | 70 |

Figure 17:
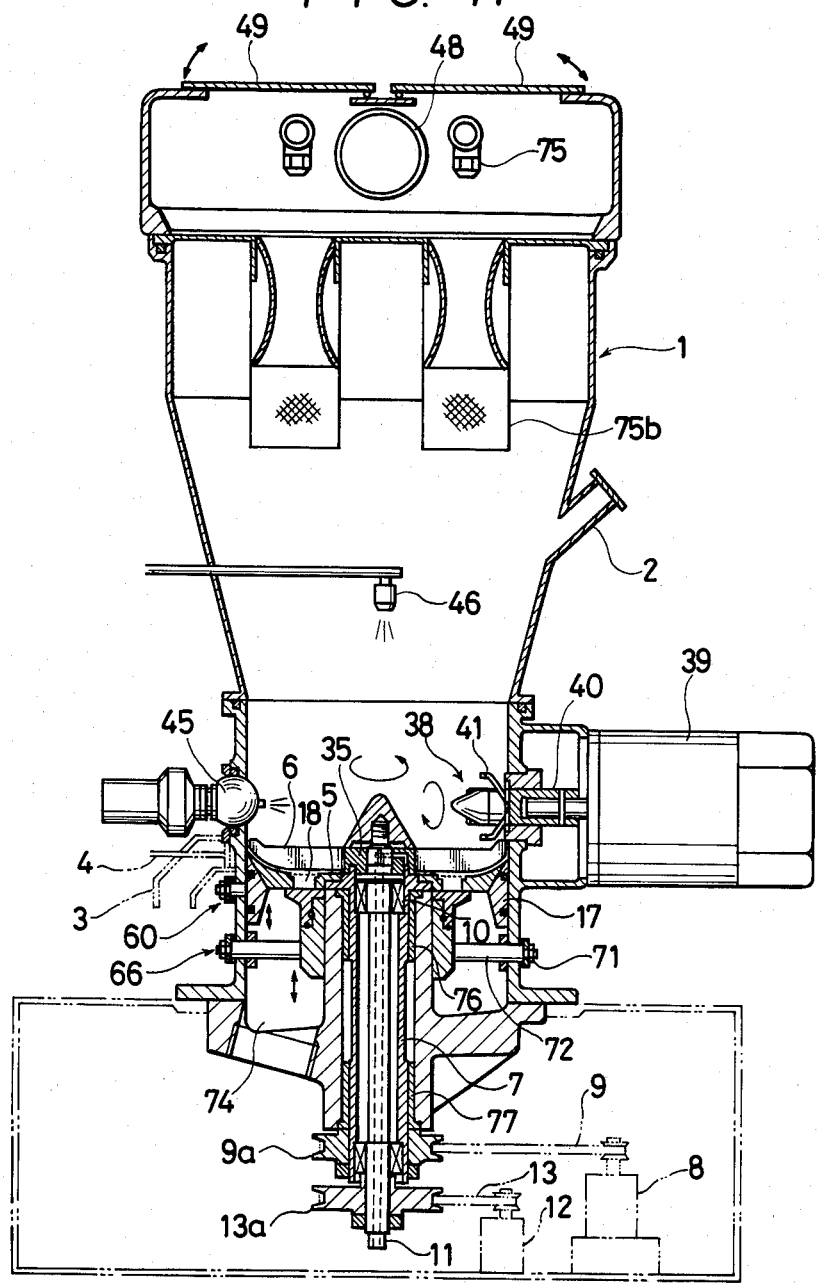
FIG. 17 is a general sectional view showing another embodiment of the granulating and coating machine in accordance with the present invention.

*4 Content of maleic acid chlorophenylamine [%] = $\frac{\text{analytical value}}{\text{theoretical value}} \times 100$ FIG. 17 is a general sectional view showing another embodiment of a granulating and coating machine in accordance with the present invention.

The general design of this embodiment is similar to that of the above embodiment shown in FIGS. 1 and 2. Therefore, same reference numerals are used for showing the same or corresponding portions or parts.

In this embodiment, the rotator 5 is rotated by driving the hollow rotary shaft 7 provided vertically at the center of the granulating chamber of the casing 1 in the desired direction via the belt 9 and a pulley 9a from the driving motor 8 of variable speed type.

The agitator 6 is rotated in the direction and at the speed independent from those of the rotator 5 by rotating the rotary shaft 11 inserted coaxially into the hollow rotary shaft 7 and supported by bearings 10 via the belt 13 and a pulley 13a from another driving motor 12 of variable speed type.

In this embodiment, the vertical positions of the rotator 5 and the agitator 6 are fixed to make it impossible to move the rotator 5 and agitator 6 upwardly and downwardly.

Further, on the inner wall of the casing 1 at a position slightly lower than the outer periphery of the rotator 5, there is provided an annular slit forming ring 17 as an annular slit forming means in order to form the annular gap or slit 16 for feeding the slit gas between the ring and the outer periphery of the rotator 5. This slit forming ring 17, as apparent in FIGS. 18 and 19, has a slit forming surface 17a in the form of an inclined outwardly upwardly expanded surface. This slit forming surface 17a is inclined to the same direction as that of a slit forming surface 5a at the outer periphery of the rotator 5, of which surface 5a is inclined inwardly downwardly to the center of the casing 1. Therefore, both of the slit forming surfaces 5a and 17a are substantially parallel to each other to form the slit 16 between the surfaces 5a and 17a upwardly outwardly.

The slit forming ring 17 of this embodiment can adjust the width of the slit 16 for example in the range of 0 to ten-odd millimeters by changing the vertical position of the ring relative to the rotator 5. Namely, in this embodiment, the slit forming ring 17 itself is movable upwardly and downwardly by means of a slit adjusting mechanism 60. This slit adjusting mechanism 60 is comprised of a slot 61 shown in FIG. 20 of a long through hole type formed to the inclined direction through the wall of the casing 1 at the position where the slit forming ring 17 is arranged, a slide shaft 62 inserted radially through the slot 61 and the inner end thereof is screwed into the slit forming ring 17, and can slide along the longitudinal direction of the slot 61 by the range of stroke S, as shown in FIG. 20, between the phantom line position and the chain dotted line position through the solid lines, a fixing means or a fixing nut 63a which can be screwed into the outer end of the slide shaft 62 and can contact on the outer surface of the casing 1 at its inner end when screwed into the shaft so as to fix the slide shaft 62 at desired position along the length of the slot 61.

Figure 20:
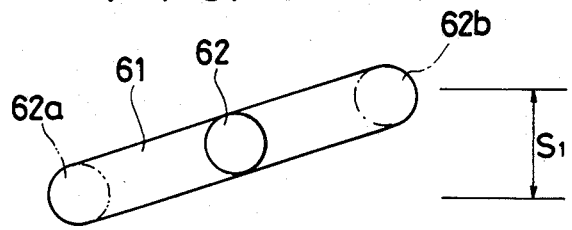
FIG. 20 is a descriptive view showing one embodiment of the slot of the slit adjusting mechanism.

The slot 61 in this embodiment is formed to be inclined with right side up condition as shown in FIG. 20. Therefore, when the slide shaft 62 is in the position shown at 62a in FIG. 20, the slit forming ring 17 is positioned in the lowermost position, then the width or distance of the slit 16 is in the largest state. On the contrary, the width of the slit is the smallest state (zero in this embodiment) when the slide shaft 62 is moved to the chain dotted line position as shown at 62b in FIG. 20, where the slit forming ring 17 is brought to the uppermost position, which makes the flow of the slit gas the minimum (the flow of the slit gas is zero or stopped in this embodiment).

As described above, the flow rate of the slit gas such as heated or cooled air blown up into the casing 1 through the slit 16 can always be controlled by adjusting the width of the slit, at the optimum rate in correspondence to the step of the granulating or coating operation etc.

Figure 18:
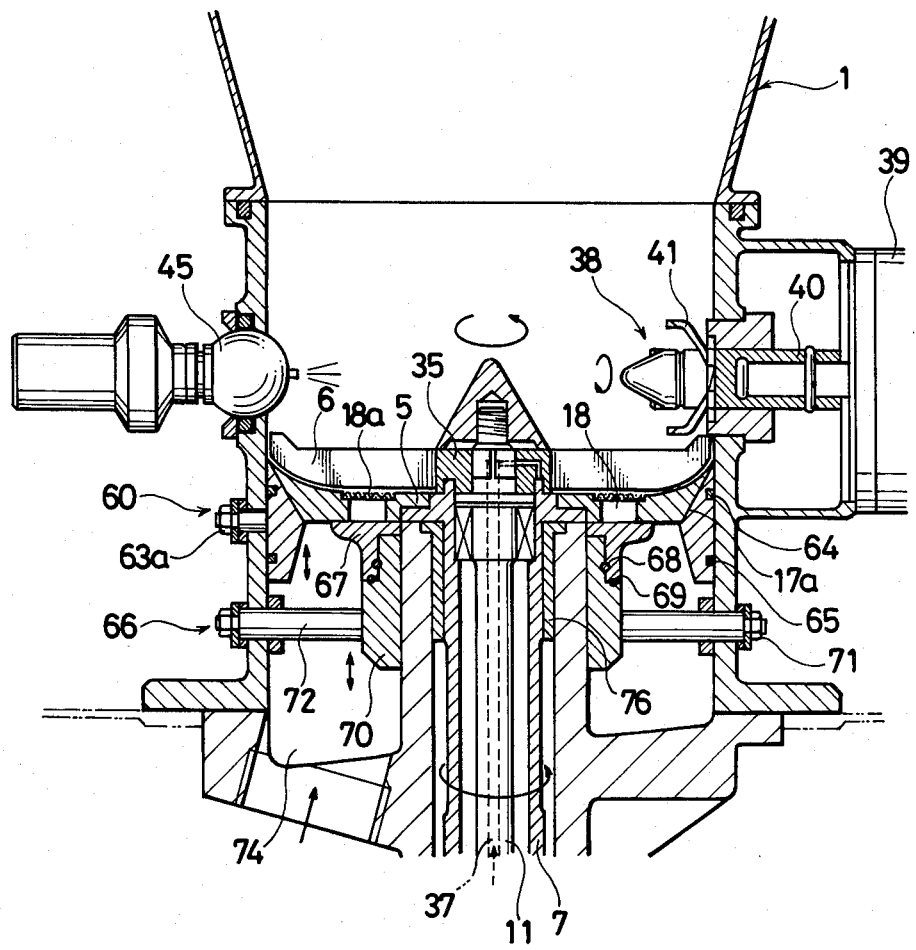
FIG. 18 is an enlarged partial sectional view of the major part thereof.

Moreover, the reference numerals 64, 65 in FIG. 18 show respectively seal rings for preventing the outside air from blowing into the casing 1 through the slit 16 and the space between the inner surface of the casing 1 and the outer periphery of the slit forming ring 17.

Figure 22:
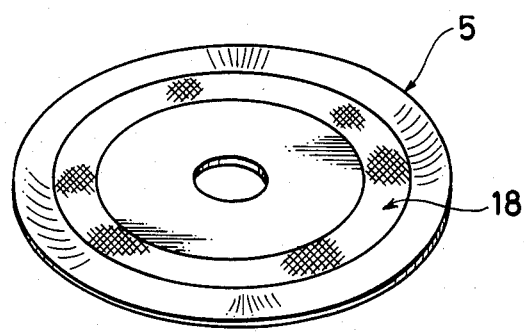
FIG. 22 is a perspective view showing one embodiment of the rotator according to the present invention.

As shown in FIG. 22, the rotator 5 of this embodiment has a ventilating portion 18 made of a ring of mesh in the circumferential position which may be slightly outside of the intermediate portion of the radial dimension thereof. This ventilating portion 18 may be made of a sintered plate or a perforated plate having such small holes that powdery or granular materials do not drop off therethrough.

The ventilating portion 18 may be provided in other than the circumferential direction, for example, it is possible to provide the ventilating portion 18 as radial notches at any positions of the rotator 5.

The purpose for which the ventilating portion 18 is provided is to produce a flow pattern of the powdery or granular materials in the casing 1 different from the flow pattern produced by the slit gas fed through the slit 16 in order to manufacture efficiently the granulated or coated products of superior quality including, for example, low segregation and widely controllable bulk density by blowing gas, for example, heated or cooled air into the casing 1 through the ventilating portion 18 from the lower side of the rotator 5, and also in order to reduce materially the drying time by feeding large volume of drying gas into the casing 1 through the ventilating portion 18 when the granulated or coated particles are dried after granulation or coating.

To control the gas fed through the ventilating portion 18 of the rotator 5, there is provided a gas flow rate adjusting mechanism 66. This adjusting mechanism 66 has a simple structure comprised of an annular cover ring 67 moved upwardly and downwardly toward or away from under surface of the rotator 5 to open or close inlet of the ventilating portion 18, a support ring 70 provided non-rotatably through rotary bearings 68 and 69 interposed between the cover ring 67 and the support ring 70, a slide shaft 72 which is attached to the support ring at one end and extended out of the casing 1 to be fastened detachably by a fastening nut 71 at the other end. The cover ring 67 is formed of fluororesin etc. and rotatable together with the rotary disk 5 when the ventilating portion 18 is closed.

Figure 21:
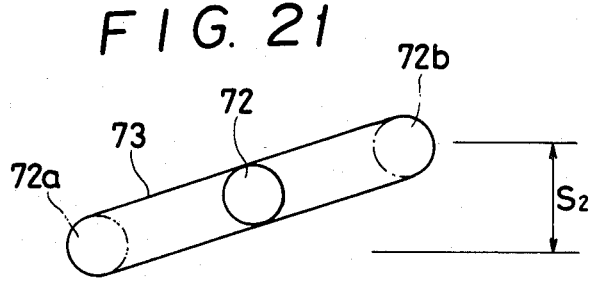
FIG. 21 is a descriptive view showing one embodiment of the slot of the gas flow rate adjusting mechanism.

The slide shaft 72 is, as shown in FIG. 21, inserted into a slot 73 formed in the side wall of the casing 1 as the same way as the slide shaft 62 in order to slide along the length of the slot in a range of stroke $S_2$. Namely, as shown in FIG. 21, since the slot 73 is inclined in the right side up condition, when the slide shaft 72 is in the phantom line position as shown at 72a in FIG. 21, the gas flow rate adjusting mechanism 66 is positioned in the lowermost position shown in FIG. 19, the ventilating portion 18 is in fully opened condition. On the contrary, the open area ratio of the ventilating portion 18 is the smallest state (zero in this embodiment) when the slide shaft 72 is moved to the chain dotted line position as shown at 72b in FIG. 21, where the cover ring 67 is brought to the uppermost position, which makes the flow rate of the gas fed through the ventilating portion 18 the minimum (the flow of the gas is zero or stopped in this embodiment).

In this embodiment, since the gas fed to the slit 16 and ventilating portion 18 is supplied from a common gas source (not shown) via common gas passage 74, the gas feeder line can be constructed simply by only one line to lower the cost, and the gas flow through each of the slit 16 and the ventilating portion 18 can be controlled independently by respective slit adjusting mechanism 60 and gas flow rate adjusting mechanism 66.

Therefore, according to this embodiment, a variety of gas flow patterns can be obtained by two gas flows fed through each of the slit 16 and the ventilating portion 18 which can be adjusted independently.

Figure 23:
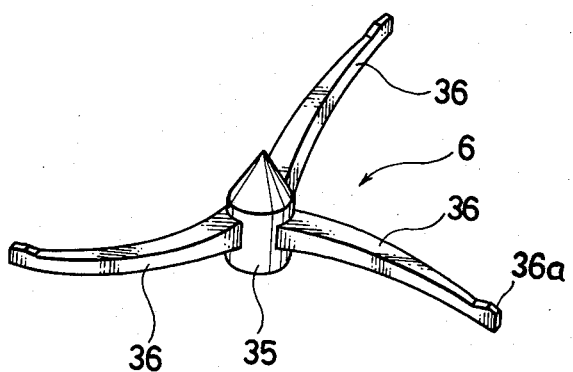
FIG. 23 is a perspective view showing one embodiment of the agitator according to the present invention.

The agitator 6 of this embodiment, as shown in FIG. 23, has three agitating blades 36 at the side of a boss 35, each of the blades 36 is like a curved nail in shape and arranged to extend at an angle of 120 degrees with each other so as to increase mixing and kneading and centrifugal effects.

Each of the agitating blades 36 of the agitator 6 in this embodiment is provided with upwardly projected portion 36a at the free end thereof in order to obtain better agitating effect.

As shown in broken line in FIG. 18, the agitator 6 is designed to blow out from the lower side of the boss 35, the purge gas fed through the gass passage 37 formed in the rotary shaft 11 in order to prevent the powdery or granular materials from entering into the gap formed between the rotary shaft 11 and the rotator 5.

Further, in this embodiment, at a position above the outside area of the agitator 6, there is provided a breaking means or disintegrator 38 arranged horizontally into the casing 1 from the outside thereof.

Figure 24:
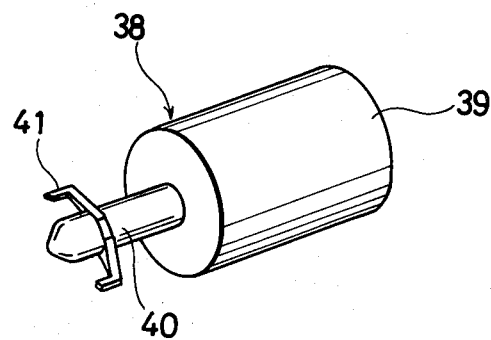
FIG. 24 is a perspective view showing one embodiment of the disintegrator according to the present invention.

As shown in FIG. 24, the disintegrator 38 is comprised of a disintegrating shaft 40 rotatable by an electric or an air motor 39, and a plurality of disintegrating blades 41 projected radially outwardly from the outer surface of the shaft 40 and have L shaped configuration. These disintegrating blades 41 are rotated in the bed of materials being granulated or coated, which are tumbled along the inner wall of the casing 1 by means of the rotations of the rotator 5 and the agitator 6. The rotational speed of the blades 41 or shaft 40 is high, for example, faster than that of the rotator 5 and the agitator 6. Thereby, the bed of powdery or granular materials being granulated or coated is given particle size regulation by crushing excessly enlarged particles, mixing and feeding back in addition to the tumbling granulation and coating actions by the rotator 5 and the agitating, mixing, and kneading actions by the agitator 6. As a result, it becomes possible to obtain granulated or coated products having smooth surface at high productivity by these multiple actions. In other words, by providing the disintegrating blades 41, it is capable of performing granulation or coating to obtain products with sharply dispersed particle size and high bulk density while subdividing the undesirously enlarged particles in the bed of powdery or granular materials being granulated or coated into the desired particle size by the shearing force of the disintegrating blades 41.

Figure 19:
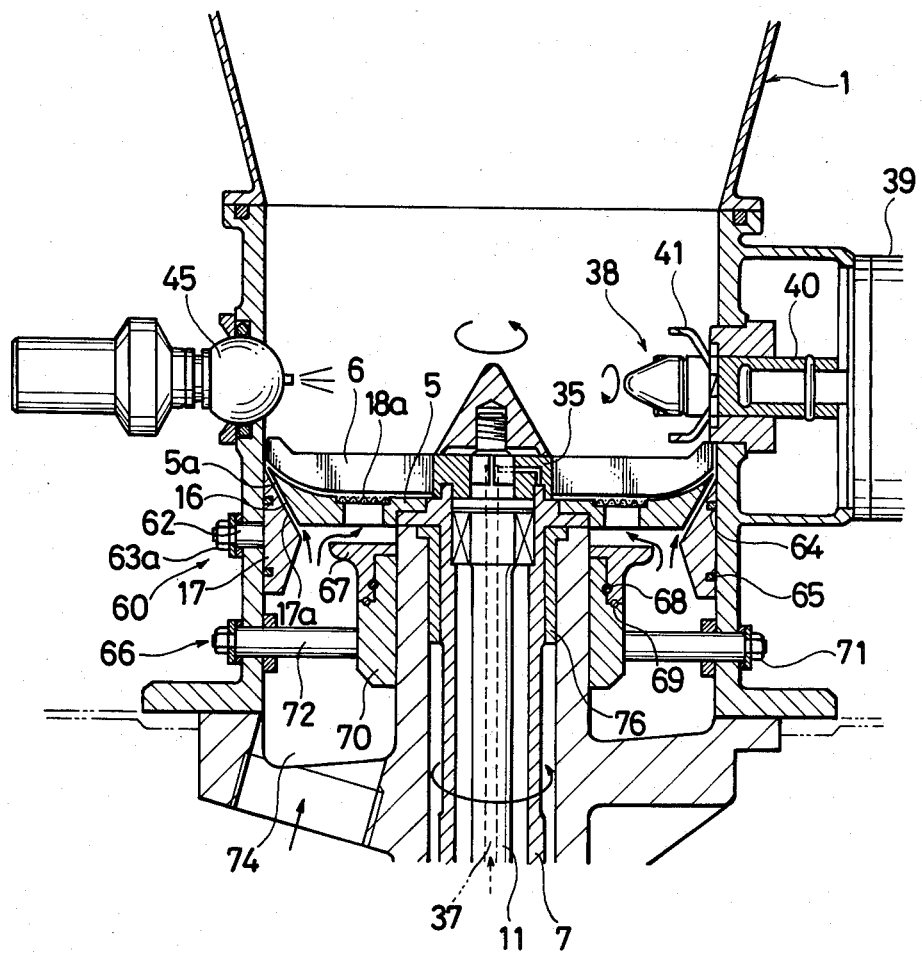
FIG. 19 is an enlarged partial sectional view of the granulating and coating machine in which the ventilating portion is shown in the opened condition.

As shown in FIGS. 17-19, at the side wall of the casing 1 near the bottom portion thereof just above the level of the agitator 6, and above the agitator at about center of the casing 1, there are provided two spray nozzles 45 and 46 respectively of two-fluid type for spraying a coating or binder solution fed from a liquid tank by each of pumps (not shown).

On the other hand, at the side wall of the casing 1 just above the spray nozzle 45, a nozzle 47 for feeding the powdery or granular materials into the fluidized or granulated bed in the casing 1.

To the side wall of the top portion of the casing 1, an exhaust duct 48 for discharging the exhaust gas from the fluidized or granulated bed out of the system is connected. In the upper portion of the casing 1, there are provided a pulse jet nozzle 75 and bag filters 75a for catching and returning fine raw materials blown up by air stream. Covers 49 for explosion vent are hinged to the top wall of the casing 1.

Further, in place of the bag filter, other type of dust collector such as a cyclone etc. may be provided at the upper area in or outside of the casing 1. However, according to this embodiment there is another merit that such dust collectors may not necessarily be provided, because by providing the disintegrator 38, the granulation or coating can be performed after the powdery or granular materials to be granulated or coated are charged in the casing 1 and enough quantity of binder or coating material is supplied onto them to wet them thoroughly so as to prevent free fine powders of the raw materials from escaping.

Reference numeral 76 and 77 show bearings such as oilless bearings.

The operation of this embodiment is described in the following part.

First, the predetermined volume of powdery or granular raw materials to be granulated or coated are fed into the casing 1 through the chute 2.

Secondary, the air supply is started and the cover ring 67 of the gas flow rate adjusting mechanism 66 is contacted with or moved nearly to the under surface of the rotator 5 or moved to the suitable position around the underside of the ventilating portion 18 to shut off perfectly the ventilating portion 18 or to allow a little volume of gas or to feed air for fluidization from the feeder fan blown into the casing 1 through the ventilating portion 18 of the rotary disk 5. If ventilating portion 18 is shut off or opened a little, it is opened later on during the operation.

Thereafter, the width of the slit 16 is set to a desired one in the following way. Namely, for setting the width of the slit 16 formed between the slit forming surface 5a of the outer periphery of the rotary disk 5 provided in the bottom portion of the granulating casing 1 and the slit forming surface 17a of the slit forming ring 17 mounted on the inner wall of the casing 1, to a predetermined distance, the fixing nut 63a of the slit adjusting mechanism 60 is loosened so as to allow the slide shaft 62 slide to a desired position in the clockwise or counterclockwise direction along the length of the slot 61. Thereby, the slit forming ring 17 is slid along the inner wall of the casing 1 together with the slide shaft 62 to adjust or change the width of the slit 16. Therefore, by rotating the fixing nut 63a on the slide shaft 62 to screw in the former when the width of the slit 16 is set to the desired one, the inner end surface of the fixing nut 63a abuts onto the outer surface of the casing 1 to fix the slit forming ring 17 at the desired level.

In such a way, after the width of the slit 16 is set to the desired distance, the rotary disk 5 is rotated in the desired direction at the desired speed by rotating the rotary shaft 7 via belt 9 by means of the motor 8 and the agitator 6 is rotated by driving the motor 12 via the belt 13 and the rotary shaft 11 in the same or reverse direction with that of the rotary disk 5 in order to agitate the materials being granulated or coated and the disintegrating blades 41 of the disintegrator 38 are also rotated by driving motor 39 to subdivide the undesirously large particles formed in the bed of powdery or granular materials being granulated or coated into desired particle size by the shearing force of the disintegrating blades 41.

After that a binder or coating solution fed from a liquid tank by the pumps (not shown) are sprayed into and/or onto the materials to be granulated or coated through the spray nozzles 45 and/or 46.

If desired, a solid or powdery granulating or coating materials may be fed onto the materials to be granulated or coated from a nozzle (not shown). The exhaust gas from the casing 1 is discharged out of the system through the exhaust duct 48. To help exhausting gas, another fan may be provided downstreamly.

Figure 25:
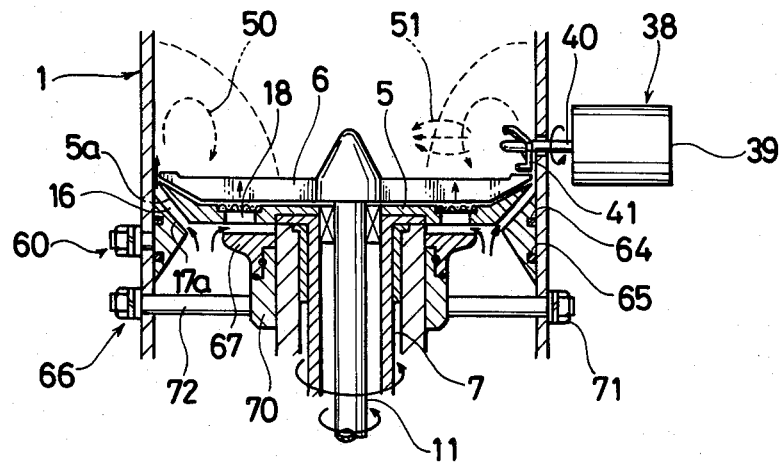
FIGS. 25 and 26 are partial vertical sectional view and partial horizontal sectional view respectively, showing granulating and coating action in accordance with the embodiment shown in FIGS. 17–24.
Figure 26:
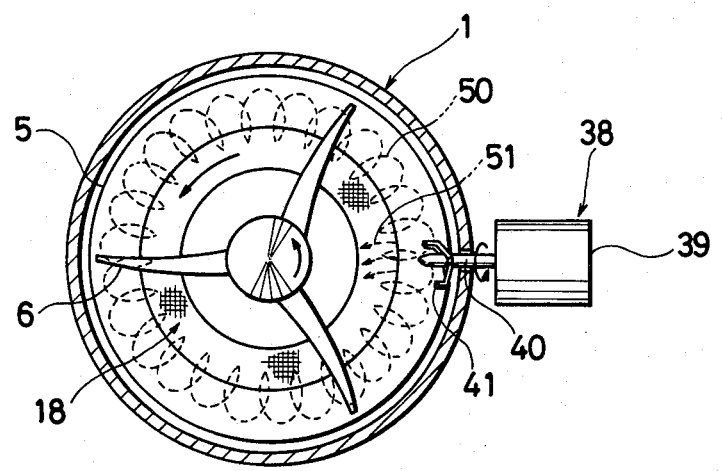

In the above operation, according to the granulating and coating machine in this embodiment, by means of the combined rotational motion of the rotator 5 and the agitator 6, and combination of two gas flows consisted of the slit gas flow through the slit 16 and the gas flow through the ventilating portion 18 of the rotator 5, the powdery or granular raw materials are fluidized, agitated, mixed, tumbled and given centrifugal force. Thereby, as shown in FIGS. 25 and 26, the powdery or granular materials form a tumbling bed or bed 50 of the materials which make tumbling motion near the inner wall of the casing 1. By rotating the disintegrating blades 41 of the disintegrator 38 in the bed 50, large particles of materials in the bed 50 are subdivided by the shearing force of the disintegrating blades 41 to form desired particles sharply of dispersed. As shown by a broken line arrow 51 in FIGS. 25 and 26, the materials are partially moved back to the center of the casing 1 against centrifugal force to cause better mixing and more tumbling.

It is possible to dry the granulated or coated particles very efficiently in a short time in order to improve productivity by agitating, tumbling, mixing, the particles being granulated or coated by means of the rotator 5, and the agitator 6, in a condition wherein the slide shaft 72 of the gas flow rate adjusting mechanism 66 is slid to a position shown at 72a in FIG. 21 to descend the cover ring 72 to the lowermost position and maximize the gas flow rate through the ventilating portion 18 after the granulation or coating is finished.

Therefore, according to this embodiment, by subdivision, mixing, dispersion, and sharpening particle size distribution etc. by means of the disintegrating blades 41 of the disintegrator 38, in addition to the combined rotational motions of the rotator 5 and the agirator 6, and combination of two gas flows consisted of the slit gas fed through the slit 16 and the gas fed through the ventilating portion 18, it is possible to obtain spherically granulated or coated particles having narrowly dispersed particle size with very high productivity.

Especially, in this embodiment, because the gas flow rate fed through the ventilating portion 18 of the rotator 5 is variably adjustable independent from the slit gas by making the cover ring 67 of the gas flow rate adjusting mechanism 66 having very simple structure contact directly with or remove from the perforated portions in the rotator, it is possible to obtain a simply structured machine with low cost and being more accurately controlled air flow than by damper etc.

Also, since only one gas feeding passage 74 common with the slit gas is provided, the structure is very simple compared with other structures wherein two gas feeding passages are provided and to reduce the cost thereof.

In this invention, as the vertical position of the slit forming ring 17 is adjusted easily to control the width of the slit 16 to the desired distance as described in the above, the rate of flow of the slit gas blown into the casing 1 through the slit 16 can be controlled always to the optimum flow rate in correspondence to any steps or sub-steps of granulation and/or coating, mixing, and drying etc. to perform best granulating or coating operations by means of the optimum flow rate of slit gas.

Further, in this embodiment, because of the structure wherein, instead of the rotator 5, the unrotatable slit forming ring 17 is moved vertically for adjusting the width of the slit 16, in comparison with the prior machine wherein the rotator is moved vertically for the same purpose, the slit adjusting mechanism 60 is much more simple in structure, much less in manufacturing cost, and is much more simple and easy in operation than one wherein the rotator is moved vertically.

Moreover, according to this embodiment, by providing the disintegrator 38, it is possible to perform granulation or coating by means of mixing kneading and subdividing obtained by the rotation of the rotator 5, agitator 6 and disintegrating blades 41 in the condition that the binder or coating solution has been fed into or onto the powdery or granular materials loaded in the casing 1. As a result, the speed of granulation or coating becomes faster, and scattering of fine powder in the casing 1 is prevented to obtain homogeneous products without segregation of ingredients.

Therefore, because of the prevention of scattering of fine powder, it is possible to omit the bag filter 75b in the casing 1. In that case, a cyclone (not shown), which is less capable in collecting fine powder, but lower in the cost and easier in handling than the bag filter, may be provided outside of the casing 1. Thereby, a granulating or coating machine of low cost and high efficiency and easy handling may be realized.

Further, in case of the powdery or granular materials which have high specific gravity, for example, ceramics, powdered metals, or ferrite etc., it is almost impossible to restart the fluidization according to prior art, once the fluidized state is broken for some reason. On the contrary, it is possible to restart the fluidization easily in this embodiment, because lifting force by air stream is helped by the rotations of the agitator 6, disintegrating blades 41 and the rotator 5.

Moreover, according to this embodiment, by providing the disintegrator 38, smaller particles than without disintegrator, can be obtained and by changing the rotational speed of the disintegrating blades 41, the particle size of the products can be changed easily. Namely, when the rotational speed of the disintegrating blades 41 is low, relatively large particles are obtained and when the rotational speed is high, relatively small particles are obtained.

The products granulated or coated are discharged smoothly from the chute 3 by the combined effect of the rotations of the rotator 5 and the agitator 6.

Figure 27:
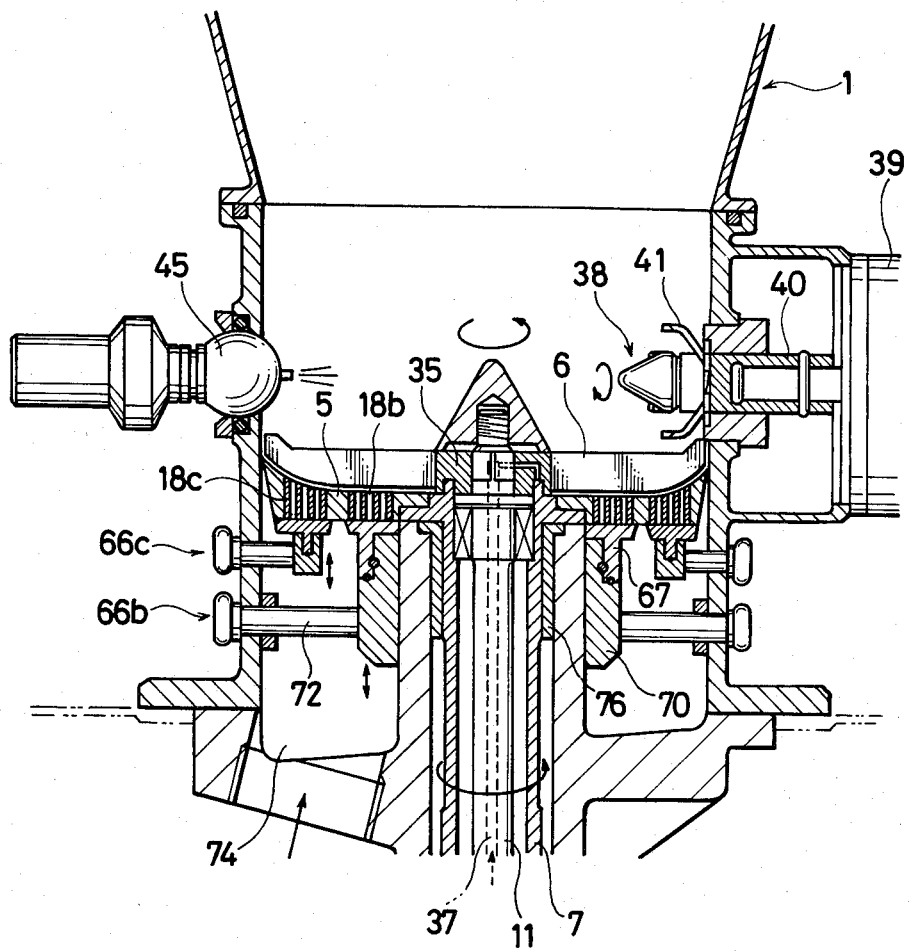
FIG. 27 is an enlarged partial sectional view of another embodiment of the present invention.

FIG. 27 is a partial sectional view showing other embodiment of a granulating and coating machine according to the present invention.

In this embodiment, the rotator 5 has two annular ventilating portions 18b and 18c formed of perforated plates at two circumferential positions thereof, gas flow rate fed through each of the ventilating portions 18b and 18c is variably adjusted by respective gas flow rate adjusting mechanisms 66b and 66c. The ventilating portion 18c near to the outer periphery of the rotator 5 and the gas flow rate adjusting mechanism 66c can act respectively similar to the slit and gas flow rate adjusting mechanism in the above embodiments.

Therefore, according to this embodiment, it is possible to perform superior granulation, coating, mixing, and drying etc., and obtain simplicity in structure and lowness in cost, by controlling independently flow rate of gas fed through each of the ventilating portions 18b and 18c.

Figure 28:
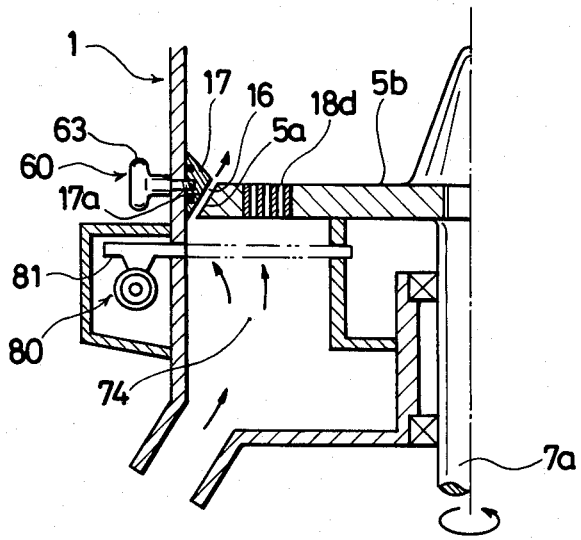
FIG. 28 is a partial half sectional view of further embodiment of the present invention.

FIG. 28 is a partial half sectional view of another embodiment of a granulating and coating machine in accordance with the present invention.

In this embodiment, the slit forming ring 17 which forms the slit 16 between the slit forming surface 17a and a slit forming surface 5a of the rotator 5b is positioned in a plane slightly higher than that of the rotator 5b, and the slit adjusting mechanism 60 has a fixing handle 63. Further, around a rotary shaft 7a beneath the rotary disk 5b having a ventilating portion 18d formed of an annular perforated plate, there is provided a diaphragm 80 as a gas flow rate adjusting mechanism for controlling flow rate of gas fed through the ventilating portion 18d and slit 16 by opening or closing the gas passage 74 communicated with the slit 16 and the ventilating portion 18d.

This diaphragm 80 is comprised of a structure such as a iris type diaphragm for use in, for example, a flow control valve or a camera. A plurality of diaphragm plates 81 of the diaphragm 80 can be moved horizontally toward center of the casing 1 from the solid line position to the phantom line position in order to close or shut the gas passage 74 to control the flow rate of gas passed through the ventilating portion 18d and to obtain superior granulated or coated particles. In this case, control of flow rate of slit gas is performed mainly by controlling width of the slit 16 by means of slit adjusting mechanism 60.

Moreover, in the embodiment shown in FIG. 28, it may be possible to omit the slit forming ring 17 and slit adjusting mechanism 60.

Figure 29:
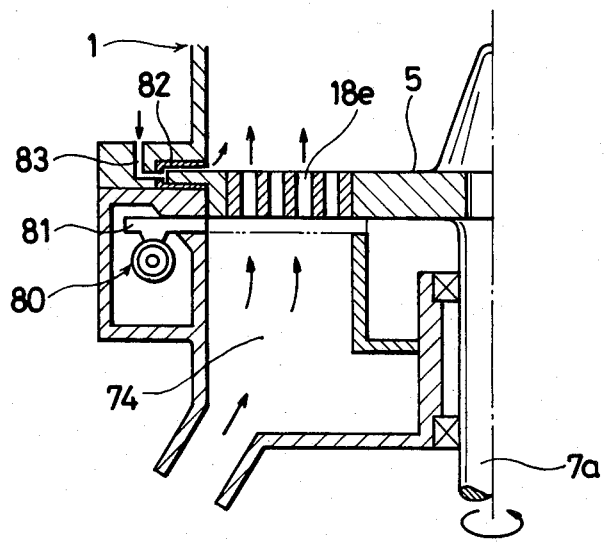
FIG. 29 is a half sectional view of another embodiment of the present invention.

FIG. 29 is a partial half sectional view showing further embodiment of a granulating and coating machine in accordance with the present invention.

In this embodiment, rotator or rotary disk 5 having an annular ventilating portion 18e is provided. Outer peripheral portion of the rotator 5 is extended into an annular groove formed in inner wall of the casing 1. Between the outer peripheral portion of the rotator 5 and the inner wall of the groove of the rotator 5, there is provided an annular seal 82, and air is introduced from an air seal hole 83 to prevent powdery or granular materials clogging in the groove.

Further, in this embodiment, the diaphragm 80 is provided at the outside of the casing 1 in order to control flow rate of gas passed through the ventilating portion 18e by moving the diaphragm plates 81 horizontally from outside to center of the casing, namely from solid line position to phantom line position in FIG. 29.

Figure 30:
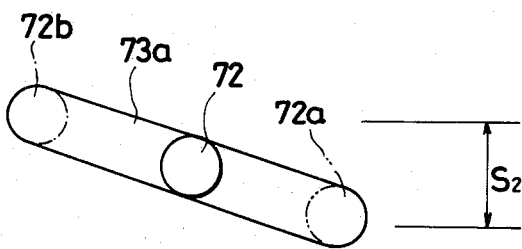
FIG. 30 is a descriptive view showing another embodiment of the slot of the gas flow rate adjusting mechanism.

FIG. 30 is a descriptive view of another slot for use in the present invention.

In this embodiment, a slot 73a is formed in the right side down condition contrary to the above embodiment shown in FIG. 21, wherein flow rate of gas passed through the ventilating portion is increased when the slide shaft 72 is moved from solid line position to phantom line position as shown at 72a, and flow rate of gas is decreased when the slide shaft is moved to chain-doted line position as shown at 72b.

Figure 31:
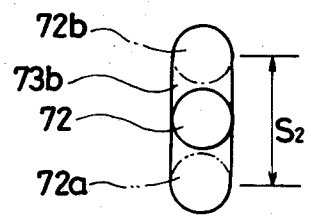
FIG. 31 is a descriptive view showing further embodiment of the slot.

FIG. 31 is a descriptive view of another embodiment of slot for use in the present invention.

A slot 73b in this embodiment is formed as a vertical slot extended straightly in the vertical direction. Therefore, according to this embodiment, flow rate of gas passed through the ventilating portion is decreased when the slide shaft 72 is moved upwardly to chain-dotted position as shown at 72b, and flow rate of gas is increased when the slide shaft 72 is moved downwardly to phantom line position as shown at 72a.

It is to be understood that the present invention is not limited to these embodiments described in the above, those skilled in the art may be to devise many other modifications. For example, the gas flow rate adjusting mechanism, the slit forming ring and the slit adjusting mechanism etc. may be comprised of constructions other than those described in the above embodiments, and can be fully or partially automated. Further in place of the rotator, a rotary plate having a disk-like configuration such as a polygonal plate may be used. Also, the agitator may be consisted of other structure and attached to lower end of a rotary shaft extended downwardly from the upper portion of the granulating casing coaxially with the rotary shaft of the rotator.

The present invention can also be applied to mixing, drying etc. as a unit operation or co.mbined operation with others.

What is claimed is:

1. A granulating and coating machine for use in the granulation, coating, mixing, and/or drying of powdery or granular materials, comprising a casing for containing powdery or granular materials to be treated, a rotary disk rotatable substantially horizontally in said casing, an annular slit for feeding slit gas into said casing formed between an inner surface of said casing and the outer periphery of said rotary disk, and at least one disintegrator provided above said rotary disk for disintegrating large particles.

2. The granulating and coating machine according to claim 1, further comprising at least one agitator arranged above said rotary disk and rotatable substantially horizontally independent from said rotator.

3. The granulating and coating machine according to claim 2, wherein at least one of said rotary disk or said agitator is movable vertically.

4. The granulating and coating machine according to claim 2, wherein said rotary disk is movable vertically, and an annular slit forming means having a slanting surface is provided on the inner wall of said casing at a position where said slit is formed between the outer periphery of said rotary disk and the slit forming means.

5. The granulating and coating machine according to claim 4, wherein said slit forming means s an annular slit forming ring provided on the inner wall of said casing and movable vertically.

6. The granulating and coating machine according to claim 4, wherein said slit forming means is a slanted inner surface of said casing.

7. The granulating and coating machine according to claim 2, wherein said agitator is attached to the lower end of a rotary shaft extending downwardly from the upper portion of said casing coaxially with a rotary shaft of said rotary disk.

8. A granulating and coating machine for use in the granulation, coating, mixing, and/or drying of powdery or granular materials, comprising a casing for containing powdery or granular materials to be treated, a rotary disk mounted within said casing in a fixed vertical position and rotatable substantially horizontally, an annular slit formed between said casing and the outer periphery of said rotary disk, at least one ventilating opening formed in at least one portion of said rotary disk, and gas flow rate adjusting means for adjusting the flow rate of gas fed through said ventilating opening.

9. The granulating and coating machine according to claim 8, wherein said gas flow rate adjusting means is comprised of cover means movable toward and away from said ventilating opening from below said rotary disk to open and close said ventilating opening and means for moving said cover means.

10. The granulating and coating machine according to claim 8, wherein said gas flow rate adjusting means is comprised of diaphragm means movable substantially horizontally to open and close gas passage to said ventilating opening.

11. The granulating and coating machine according to claim 8, further comprising slit adjusting means movable vertically for adjusting the width of said slit to change the flow rate of gas fed through said slit.

12. The granulating and coating machine according to claim 8, further comprising an agitator rotatable substantially, horizontally in said casing independent from said rotary disk.

13. The granulating and coating machine according to claim 8, further comprising at least one disintegrator provided above said rotary disk for disintegrating large particles.

14. The granulating and coating machine according to claim 8, further comprising an agitator rotatable substantially horizontally in said casing independent from said rotary disk, and at least one disintegrator provided above said rotary disk for disintegrating large particles.

* * * * *